(12) United States Patent
Mariotto et al.

(10) Patent No.: US 9,194,630 B2
(45) Date of Patent: Nov. 24, 2015

(54) DUAL AIR FLOW EXCHANGER WITH ENHANCED HEAT AND HUMIDITY TRANSFERS

(75) Inventors: Mathieu Mariotto, La Motte Servolex (FR); Stephane Colasson, Voreppe (FR); Odile Gerbaux, Montaud (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 387 days.

(21) Appl. No.: 13/824,646

(22) PCT Filed: Oct. 4, 2011

(86) PCT No.: PCT/EP2011/067272
§ 371 (c)(1),
(2), (4) Date: May 20, 2013

(87) PCT Pub. No.: WO2012/045717
PCT Pub. Date: Apr. 12, 2012

(65) Prior Publication Data
US 2013/0233514 A1    Sep. 12, 2013

(30) Foreign Application Priority Data

Oct. 6, 2010   (FR) ..................... 10 58092

(51) Int. Cl.
*F28D 7/02*    (2006.01)
*F28F 1/02*    (2006.01)
(Continued)

(52) U.S. Cl.
CPC ................ *F28F 1/022* (2013.01); *F24F 3/147* (2013.01); *F24F 12/006* (2013.01);
(Continued)

(58) Field of Classification Search
CPC .............. F28D 9/0062; F28D 21/0015; F28D 21/0014; F28F 21/0065; F28F 1/022; F24F 2003/1435; Y02B 30/563
USPC ..................................... 165/165, 66
See application file for complete search history.

(56) References Cited

U.S. PATENT DOCUMENTS 1,869,338 A * 7/1932 Ihde ............... 165/149
4,093,435 A * 6/1978 Marron et al. ........... 96/125
(Continued)

FOREIGN PATENT DOCUMENTS

JP       59-177119 A    10/1984
JP       62-61881       4/1987
JP       2009-2575      1/2009

OTHER PUBLICATIONS

International Search Report issued Dec. 29, 2011 in PCT/EP2011/067272.
English translation of Japanese Office Action issued Jun. 22, 2015 in Patent Application No. 2013-532163.

*Primary Examiner* — Tho V Duong
(74) *Attorney, Agent, or Firm* — Oblon, McClelland, Maier & Neustadt, L.L.P.

(57) ABSTRACT

A dual air flow exchanger, enabling heat transfer and humidity transfer between two air flows, and including a plurality of air circulation networks stacked on each other along a stacking direction and separated in pairs by membranes permeable to water vapor and impermeable to air. At least one of the networks is made from a honeycomb structure with its two sides bearing on two of the membranes, the structure including cylindrical cells with axes parallel to the direction, and in which at least some of the cell faces are perforated to allow air passage.

7 Claims, 4 Drawing Sheets

(51) Int. Cl.
  *F24F 3/147* (2006.01)
  *F24F 12/00* (2006.01)
  *F28D 9/00* (2006.01)
  *F28D 21/00* (2006.01)
  *F28F 21/06* (2006.01)
  *A23C 3/02* (2006.01)
  *F24F 3/14* (2006.01)

(52) U.S. Cl.
  CPC ......... *F28D 9/0062* (2013.01); *F28D 21/0014* (2013.01); *F28D 21/0015* (2013.01); *F28F 21/065* (2013.01); *F24F 2003/1435* (2013.01); *Y02B 30/563* (2013.01)

(56) References Cited

U.S. PATENT DOCUMENTS

| | | | |
|---|---|---|---|
| 4,911,775 A | | 3/1990 | Kuma et al. |
| 5,339,653 A * | | 8/1994 | DeGregoria ............... 62/467 |
| 5,771,707 A * | | 6/1998 | Lagace et al. ............... 62/271 |
| 7,127,908 B2 * | | 10/2006 | Flaugher et al. ............ 62/271 |
| 8,256,497 B2 * | | 9/2012 | Gietzen ..................... 165/54 |
| 2004/0118554 A1 | | 6/2004 | Dobbs et al. |
| 2004/0140085 A1 | | 7/2004 | Dobbs et al. |
| 2007/0144351 A1 * | | 6/2007 | Taira et al. ................ 96/223 |
| 2008/0085437 A1 * | | 4/2008 | Dean et al. ............... 429/26 |
| 2009/0126898 A1 | | 5/2009 | Eplee et al. |

* cited by examiner

DUAL AIR FLOW EXCHANGER WITH ENHANCED HEAT AND HUMIDITY TRANSFERS

This invention relates to the field of dual air flow exchangers of the type enabling heat transfer and also transfer of humidity between two air flows passing through the exchanger. Such an exchanger providing this double transfer is also frequently known as a "total exchanger" or "enthalpic exchanger".

The invention is preferably applied to the field of air treatment and air conditioning systems for home and tertiary building applications. In this application, the exchanger guarantees heat transfer between the foul air flow and the new air flow and also a transfer of humidity between these two flows, from the wetter medium towards the dryer medium.

The invention is used in applications in other technical fields, for example in the cryogenic or the heat recovery field.

Such exchangers are widely known in prior art. Nevertheless there is a need to optimise these exchangers in terms of heat transfer and humidity transfer efficiency.

The invention satisfies this need by disclosing a dual air flow exchanger enabling heat transfer and humidity transfer between the two air flows and comprising a plurality of air circulation networks stacked on each other along a stacking direction and separated in pairs by membranes permeable to water vapour and impermeable to air. According to the invention, at least one of said networks is made from a honeycomb structure with its two sides bearing on two of said membranes, said honeycomb structure having cylindrical cells with axes parallel to said stacking direction, and in which at least some of the faces forming these cells are perforated to allow air passage.

The invention is remarkable in that the choice of the honeycomb structure and the orientation of its cells within the exchanger makes it possible to optimise heat transfers between the two air flows. The polygonal and preferably hexagonal shape of the cells increases the secondary exchange surface composed of the faces of the cells. This secondary surface provokes a so-called "fin" effect, and is also further increased when some of the faces of these cells are not perforated. Also, due to the polygonal shape of the cells, fluid recirculation is set up optimising convective exchanges between the air flow and the membranes. This recirculation may be adapted as a function of the needs encountered, by judiciously choosing the faces of the cells to be perforated and the faces to be kept without perforations. For example, the perforations made within the honeycomb structure may be designed to allow an air flow to make several passes within the structure before being extracted from it. Another example lies in the creation of an air flow distribution zone and/or a collection zone within the honeycomb structure.

The honeycomb structure is preferably metallic, for further enhanced heat conduction.

The invention is also remarkable in that it facilitates the transfer of humidity between the two air flows by keeping a large part of the membranes active. Each membrane permeable to water vapour and impermeable to air is in contact only with the edges of the cells in its associated structures, which forms a useful remaining surface important for the transfer of water vapour.

The mechanical strength of the exchanger is also very satisfactory due to the use of honeycomb structures and the specific orientation of its cells.

Preferably, the exchanger is configured so that air circulation inside the exchanger takes place in co-currents, cross currents or more preferably counter-currents.

Preferably, said membranes are made from a polymer material or paper.

Preferably, each of said networks is made from a honeycomb structure. Nevertheless, it could be otherwise without going outside the scope of the invention.

Preferably, at least one of the networks has cell axes offset from the axes of cells in at least one of the networks directly consecutive along the stacking direction. This further reinforces the mechanical strength of the exchanger. In this respect, the honeycomb structures are preferably arranged staggered in the exchanger along the stacking direction.

Finally, another purpose of the invention is an air treatment and conditioning system comprising an exchanger like that described above.

Other advantages and characteristics of the invention will become clear after reading the non-limitative detailed description given below.

This description will be made with reference to the appended drawings in which.

Figure 1:
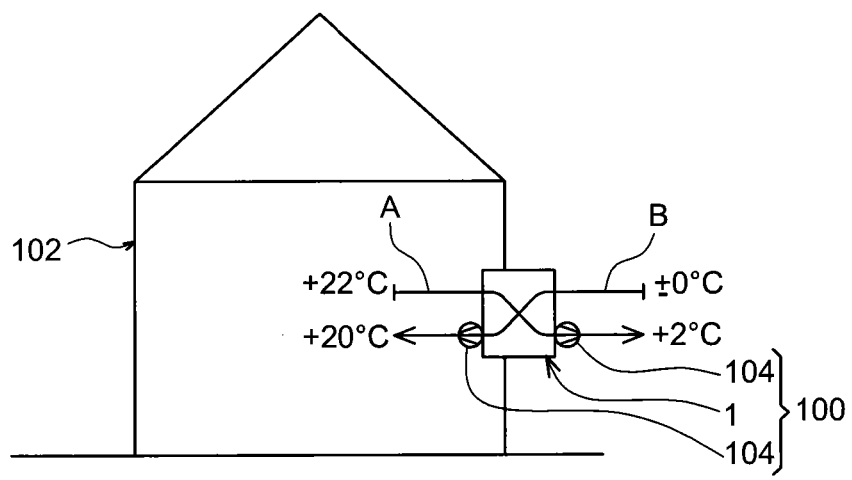
FIG. 1 shows a diagrammatic front view of an air treatment and conditioning system comprising a dual air flow exchanger according to this invention.

With reference to FIG. 1, the figure shows an air treatment and conditioning system 100, installed in a building 102. This system 100 comprises in particular a dual air flow exchanger 1, specific to this invention. In this case, the exchanger 1 guarantees heat transfer between the foul air flow A that exits from the building 102, and the new air flow B entering this building. In other words, in addition to renewing the air in the building 102, the system 100 due to its heat exchanger 1, recovers heat or cold from the foul air A being evacuated from the home, and supplies it to the new incoming air flow B. Therefore, the system 100 prevents wasted energy for heating or air conditioning of the building 102.

For example, the foul air flow A may be at a temperature of 22° C. before it leaves the building, and the new air flow B may be at a temperature of 0° C. before it enters the building. After heat transfer in the exchanger, the flow B may reach 20° C. at the outlet from the exchanger as it enters into the building, and the flow A may be cooled to a temperature of 2° C. as it leaves the exchanger and the building.

The system 100 is completed by two fans 104 shown diagrammatically in FIG. 1, to force circulation of flows A and B.

The exchanger 1 is also designed to provide humidity transfer between these two flows A and B, from the wettest medium towards the driest medium. Therefore this exchanger 1 is qualified as a total exchanger or enthalpic exchanger.

Figure 2:
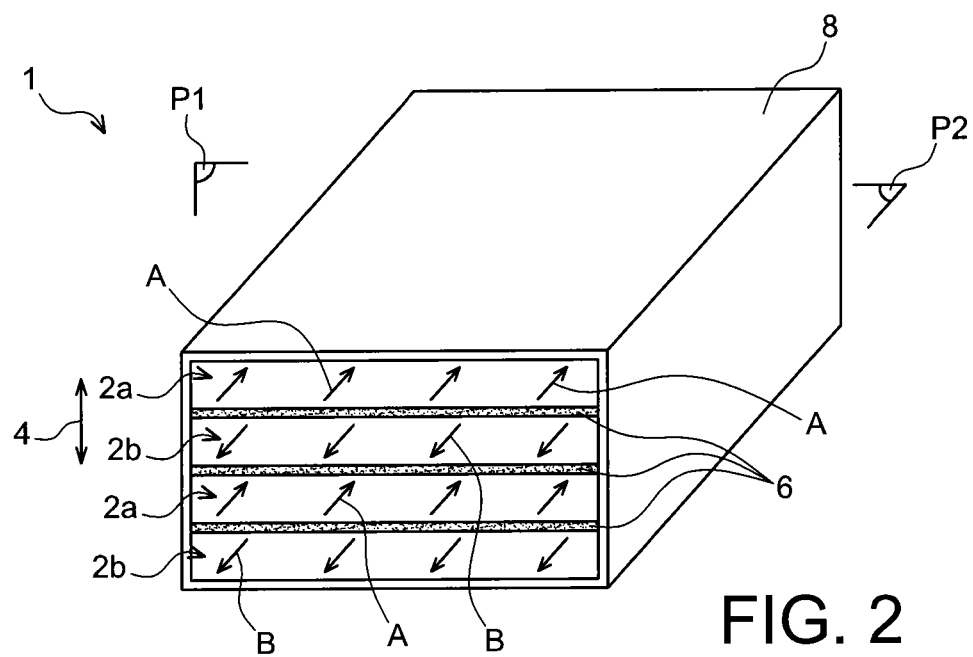
FIG. 2 shows a diagrammatic perspective view in more detail of the exchanger shown in FIG. 1.

In FIG. 2, it can be seen diagrammatically that the exchanger 1 comprises a plurality of air circulation networks 2a, 2b stacked on each other along a stacking direction 4. The networks 2a, 2b are arranged alternately, and are designed for the circulation of foul air A and circulation of incoming new air B respectively, as is shown diagrammatically by the arrows in FIG. 2. The exchanger is a counter-current exchanger, namely the flow direction A within the networks 2a is practically opposite to the flow direction B within the networks 2b.

A polymer membrane 6 permeable to water vapour and impermeable to air is provided between the networks 2a and 2b directly consecutive to each other along the direction 4. Therefore, the transfer of humidity between the two flows A and B takes place through these membranes 6 separating the networks in pairs.

Therefore the membranes 6 inserted between the networks 2a, 2b are supported by these networks. The global stack is inserted in a cage or envelope 8, providing leak tightness and preventing communication between networks 2a and networks 2b.

FIGS. 3 to 6 show the design of the stack of membranes 6 and networks 2a, 2b in more detail.

Figure 4:
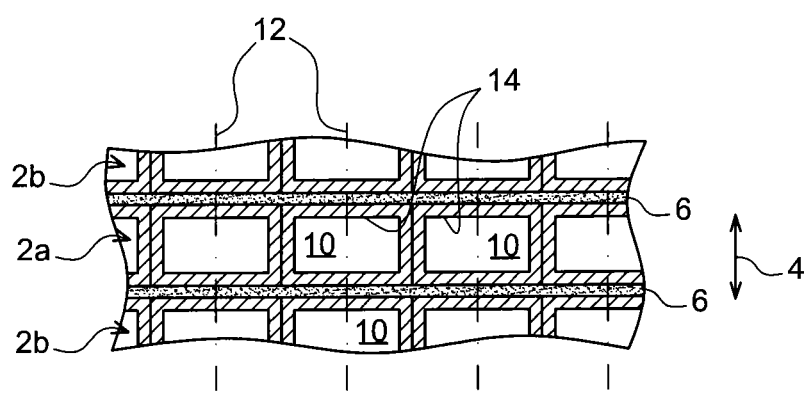
FIG. 4 is a sectional view of a part of the exchanger, on plane P1 in FIG. 2.
Figure 5:
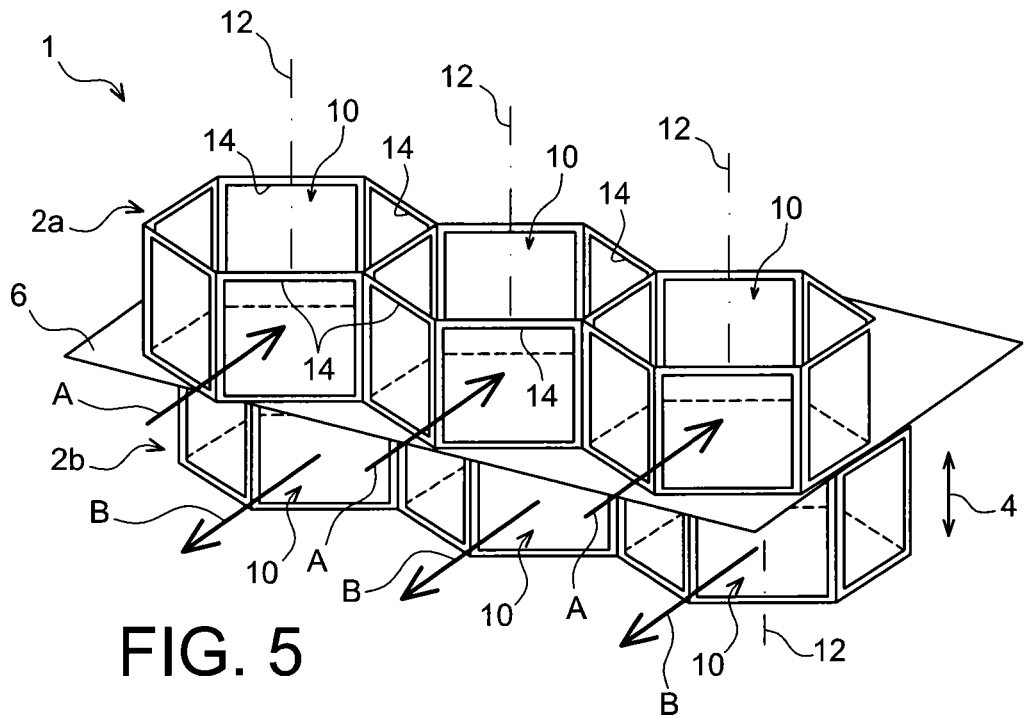
FIG. 5 is a perspective view of a part of the exchanger shown in FIGS. 2 to 4.
Figure 6:
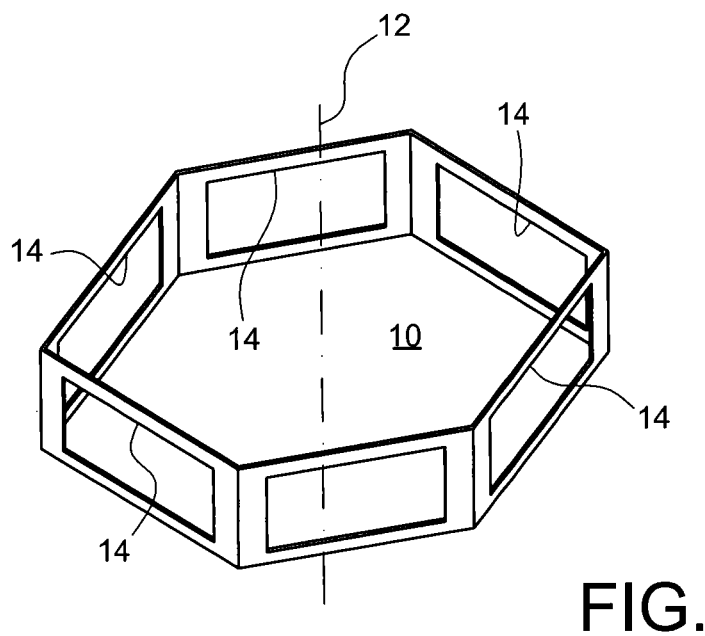
FIG. 6 is a perspective view of one of the cells forming the air circulation networks of the exchanger.

Globally, each network 2a, 2b is made from a metallic honeycomb structure in which the cylindrical cells 10 with hexagonal cross-section have axes 12 parallel to the stacking direction 4. Consequently, only the top and bottom edges of the cells 10 are in contact with the membranes 6, as can be seen in FIGS. 4 and 5.

Furthermore, in order to enable the circulation of air flows through the structures 2a, 2b, at least part of the faces forming the cells in a plane orthogonal to the axes 12 of the cells are perforated. These perforations 14 are provided on all faces or only on some of the faces, and are preferably in the form of a rectangle centred on the face concerned. The surface area of each perforation 14 may be between 40 and 75% of the surface area of the cell face on which it is made.

Figure 3:
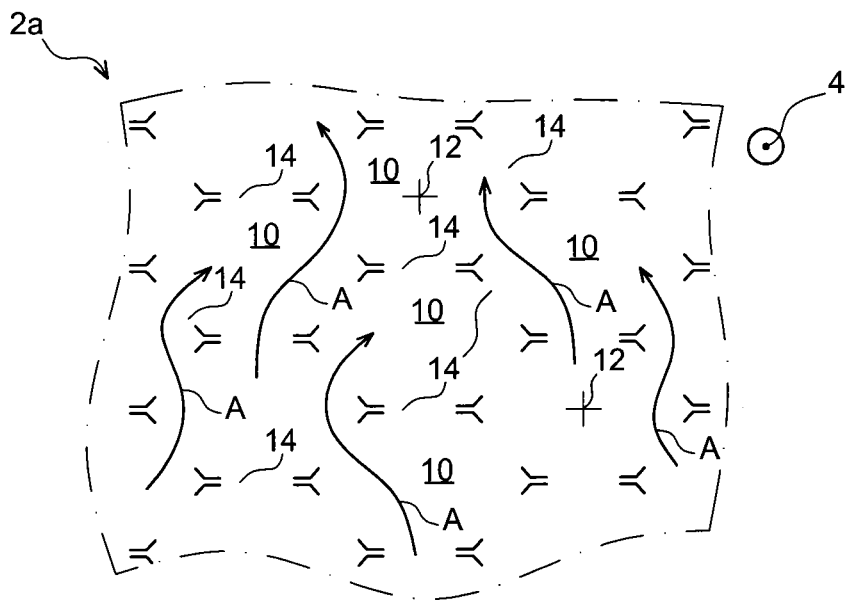
FIG. 3 is a sectional view of a part of an air circulation network of the exchanger, on plane P2 in FIG. 2.

Thus, as shown diagrammatically by arrow A in FIG. 3, the foul air flow A may wind through the structure 2a before escaping from it, passing from one cell to the next through perforations 14. Obviously, the same is true for the new air flow B passing through the honeycomb structures 2b. In general, this configuration improves heat transfers and water vapour transfers between the two air flows A and B.

The mechanical strength of the stack is also very satisfactory, particularly due to the use of honeycomb structures. Furthermore, these structures 2a, 2b are preferably offset from each other so that the axes 12 of the cells in structures 2a, 2b directly consecutive to each other are not coincident. For example, a staggered arrangement is selected along the stacking direction, in which all the structures 2a are in the same position, implying that the axes 12 of their cells are coincident in pairs, and the structures 2b are all in the same position implying that the axes 12 of their cells are also coincident in pairs. Nevertheless, as can be seen in FIG. 5, each structure 2a is offset from the structure 2b directly consecutive to it along the stacking direction 4, along a direction of the plane orthogonal to this stacking direction 4. The offset may be made over an identical distance or close to a half-cell width.

The invention provides perfect control over flow circulation within each of the structures 2a, 2b, by judiciously choosing the faces of cells to be perforated and the faces to be kept. For example, in the other embodiment in FIG. 7, an air flow distribution zone and an air flow collection zone are formed within each honeycomb structure 2a, 2b.

For each structure 2a, the structure has perforations in each of the faces of the cells 10, except for some cells located close to the inlet edge of the flow A, and some cells located close to the outlet edge of this flow A.

Figure 7:
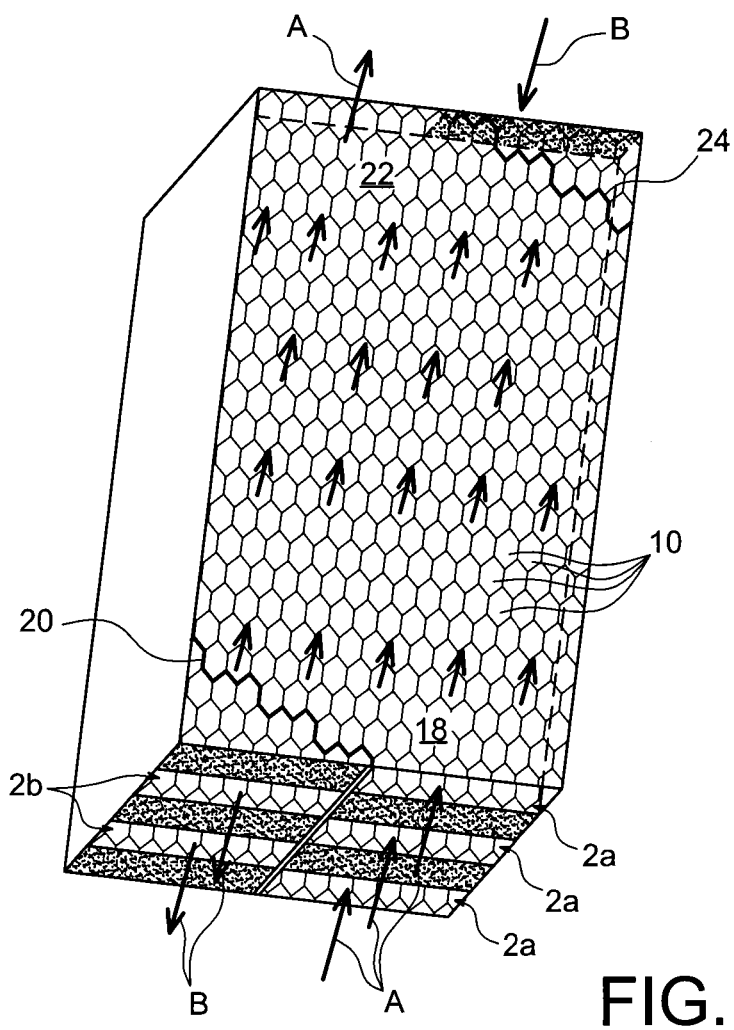
FIG. 7 is a view similar to the view in FIG. 2, in a different embodiment of the exchanger.

Only the right half of the inlet edge of the upper structure 2a is designed for inlet of the flow A into the structure, the other half shown in grey in FIG. 7 being closed off. Furthermore, some faces of cells, also shown in grey in FIG. 7, are not perforated in order to create a distribution zone 18 of the flow A. These faces, as seen in the top view, form a line 20 that starts from the junction between the two halves of the inlet edge, and extends towards the left along the general direction of the flow A. Consequently, the flow along the distribution zone 18 extends progressively from a half structure width to a whole structure width, being guided by the air tight line 20.

Furthermore, only the half left of the outlet edge of the upper structure 2a is designed for extraction of flow A from the structure, the other half shown in grey in FIG. 7 being closed off. Furthermore, some cell faces also shown in grey in FIG. 7 remain non-perforated in order to create a collection zone 22 of the flow A. These faces, seen in a top view, form a line 24 that starts from the junction between the two halves of the outlet edge and extends towards the right, along the direction opposite to the direction of flow A. Consequently, the flow following the collection zone 22 gradually narrows from a whole structure width to a half structure width, being guided by the air tight line 24.

This configuration is preferably adopted for all structures 2a, while structures 2b are designed to adopt the reverse configuration. Consequently, the inlet of flow A on the view in FIG. 7 takes place over the entire height of the stack, on the right half of the stack, while the outlet of flow A takes place over the entire height of the stack, on the left half of the stack. Similarly, the inlet of flow B in counter-current takes place over the entire height of the stack on the right half of the stack, while the outlet of flow B takes place over the entire height of the stack, on the left half of the stack.

Thus, the front face of the exchanger 1 has a right half specifically for the inlet of flow A and a left half specifically for the outlet of flow B, while the back face of the exchanger has a right half dedicated to the inlet of flow B and a left half dedicated to the outlet of flow A.

For guidance, note that the fabrication of honeycomb structures 2a, 2b may be conventional, using plates/sheets made of aluminium or another metal corrugated by a press before being welded to each other to form the cells. The perforations of the faces are then preferably made before the pressing step by cutting metallic sheets, for example by laser cutting, water jet cutting or even by stamping.

Obviously, those skilled in the art could make various modifications to the invention that has just been described, as non-limitative examples only.

The invention claimed is:

1. A dual air flow exchanger, enabling heat transfer and humidity transfer between two air flows, comprising:
    a plurality of air circulation networks stacked on each other along a stacking direction and separated in pairs by membranes permeable to water vapor and impermeable to air,
    wherein at least one of the networks is made from a honeycomb structure with its two sides bearing on two of the membranes, the honeycomb structure including cylindrical cells with axes parallel to the stacking direction, and wherein at least some of the faces forming the cells are perforated to allow air passage, wherein at least one of the networks includes cell axes offset from the axes of the cells in at least one of the networks directly consecutive along the stacking direction.

2. An exchanger according to claim 1, wherein the cylindrical cells have a hexagonal cross-section.

3. An exchanger according to claim 1, configured so that air circulation inside the exchanger takes place in co-currents, cross currents, or counter-currents.

4. An exchanger according to claim 1, wherein the membranes are made from a polymer material or paper.

5. An exchanger according to claim 1, wherein each of the networks is made from a honeycomb structure.

6. An exchanger according to claim 1, wherein each honeycomb structure is metallic.

7. An air treatment and air conditioning system comprising an exchanger according to claim 1.

* * * * *